United States Patent [19]

Marles et al.

[11] 4,120,287

[45] Oct. 17, 1978

[54] SOLAR HEATING PANELS

[75] Inventors: Kevin C. Marles; Brian W. Spencer, both of Torquay; Raymond Spencer, St. Ives, all of England

[73] Assignee: Solar Apparatus & Equipment Limited, London, England

[21] Appl. No.: 778,229

[22] Filed: Mar. 16, 1977

[30] Foreign Application Priority Data

Apr. 13, 1976 [GB] United Kingdom ............... 15022/76

[51] Int. Cl.² .............................................. F24J 3/02
[52] U.S. Cl. .................................... 126/271; 237/1 A
[58] Field of Search ................ 126/270, 271; 237/1 A

[56] References Cited

U.S. PATENT DOCUMENTS

| 1,753,227 | 4/1930 | Wheeler et al. | 126/271 |
| 3,039,453 | 6/1962 | Andrassy | 126/271 |
| 3,952,725 | 4/1976 | Edmondson | 126/271 |
| 3,972,317 | 8/1976 | Gallagher | 126/271 |
| 3,985,117 | 10/1976 | Sallen | 126/271 |
| 3,987,783 | 10/1976 | Powell | 126/271 |

Primary Examiner—Kenneth W. Sprague
Attorney, Agent, or Firm—Bacon & Thomas

[57] ABSTRACT

A solar heating panel provides for improved heat transfer between an absorber plate, which receives solar radiation, and tubes, which carry water to be heated, by clamping the tubes into channels formed in the absorber plate. The clamping is effected through upper bar members acting on the top of the absorber plate, and thermally insulating material supporting the tubes and itself supported by lower bar members below the absorber plate. The lower bar members do not contact either the tubes or the absorber plate. Advantageously, the upper bar members which contact the absorber plate, the absorber plate itself, and the metal frame members to which the upper bar members are secured are all made of corrosion resistant aluminium alloy. The tubes used for carrying the water to be heated may also be made of a similar alloy.

14 Claims, 9 Drawing Figures

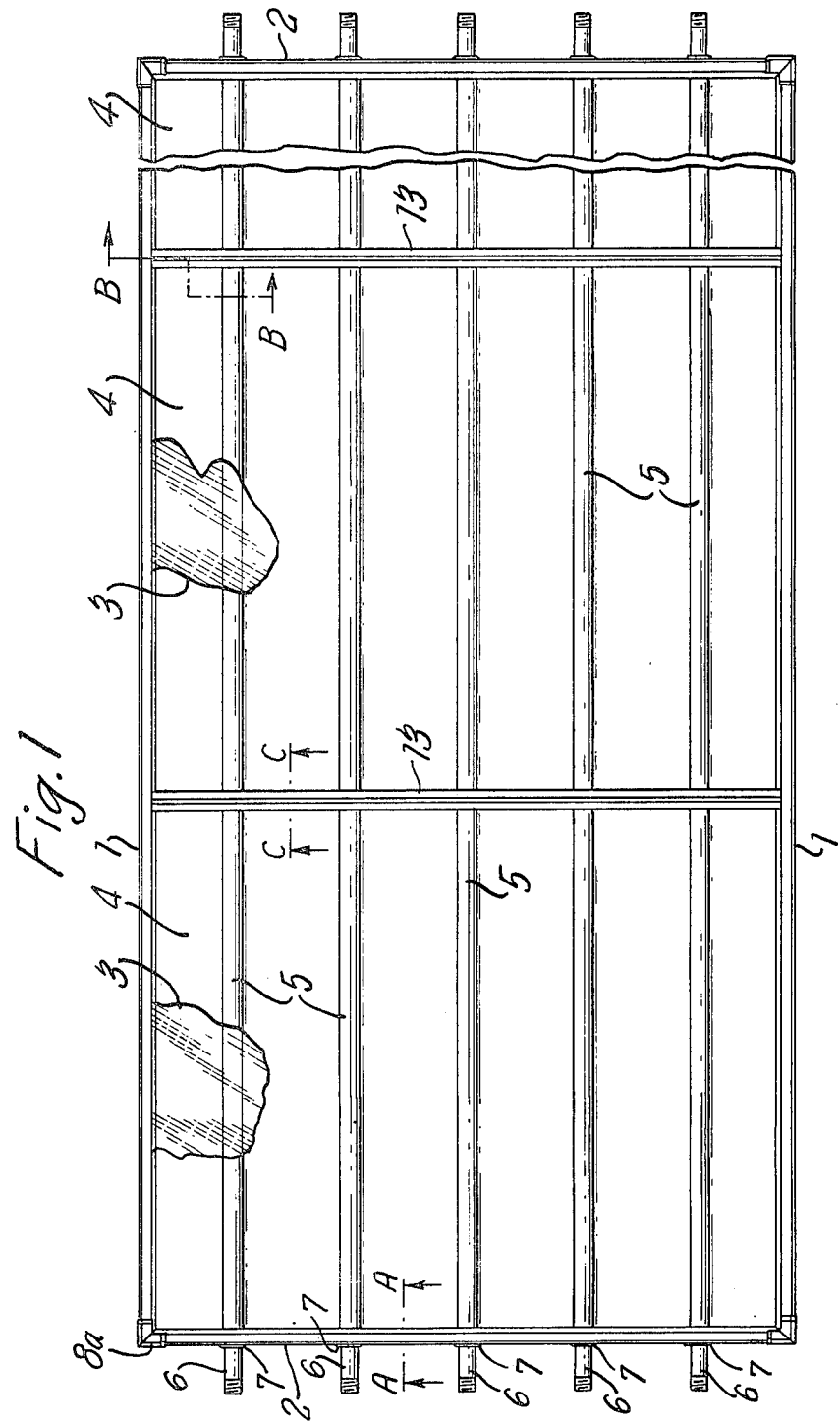

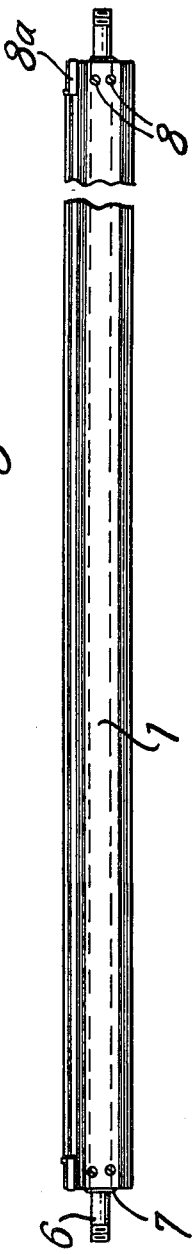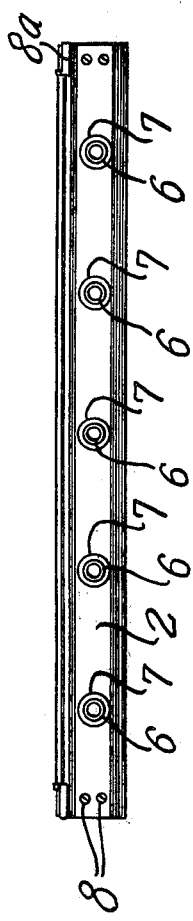

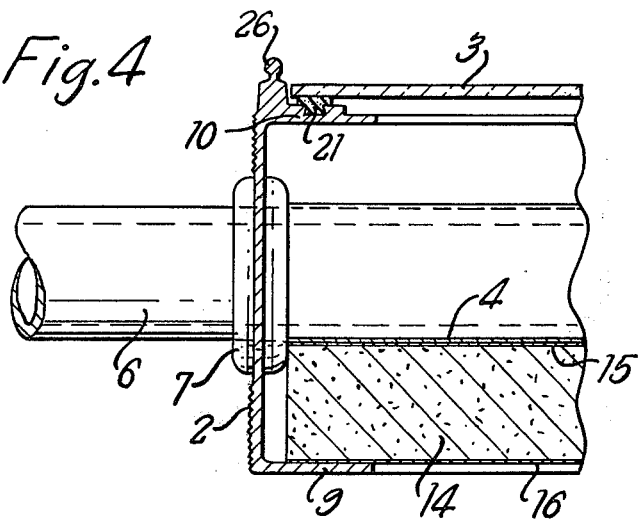
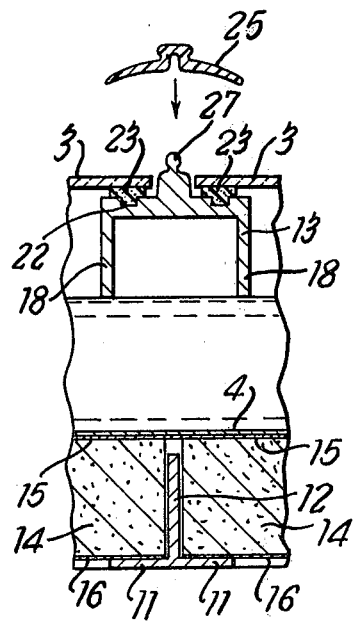

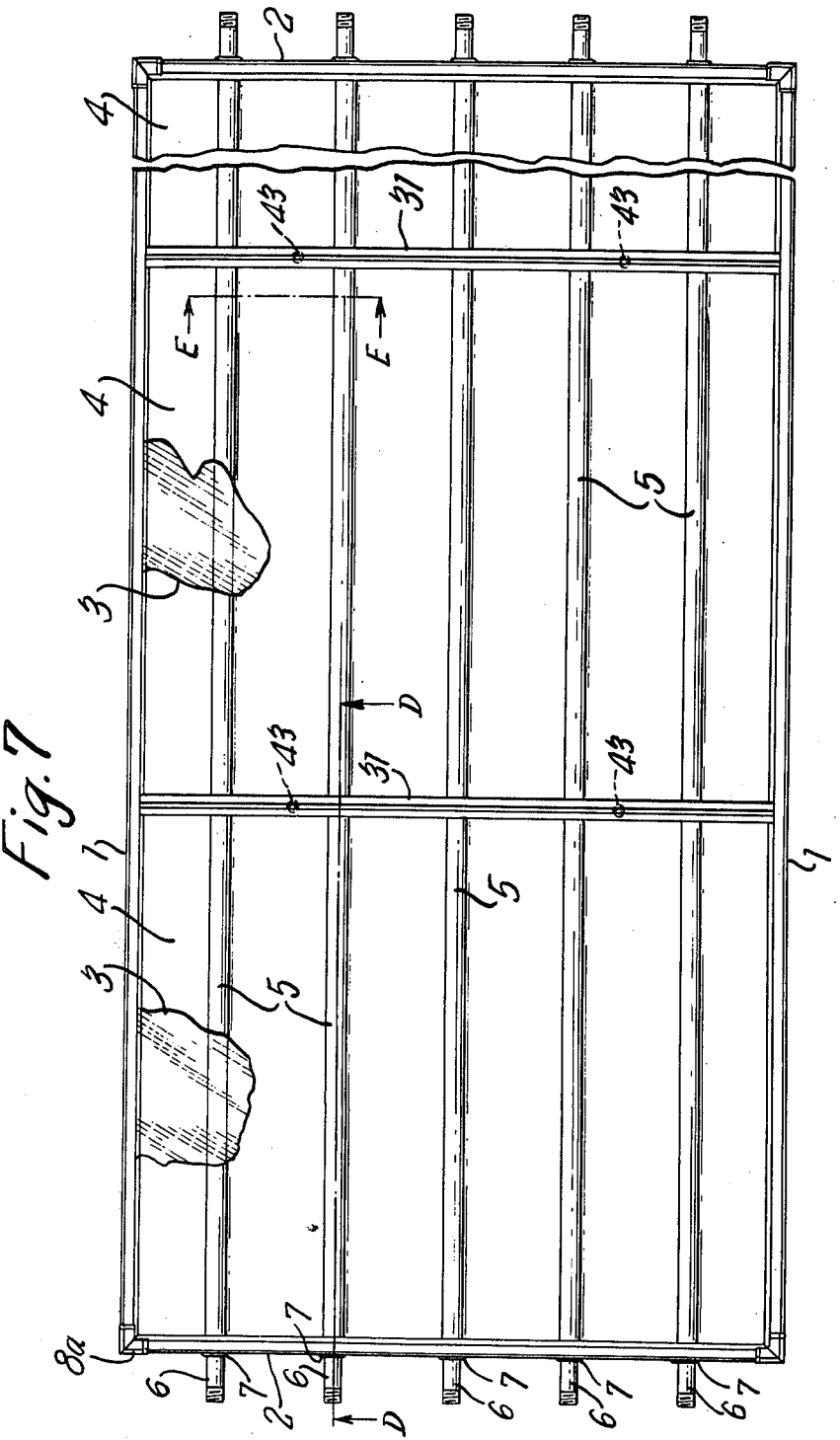

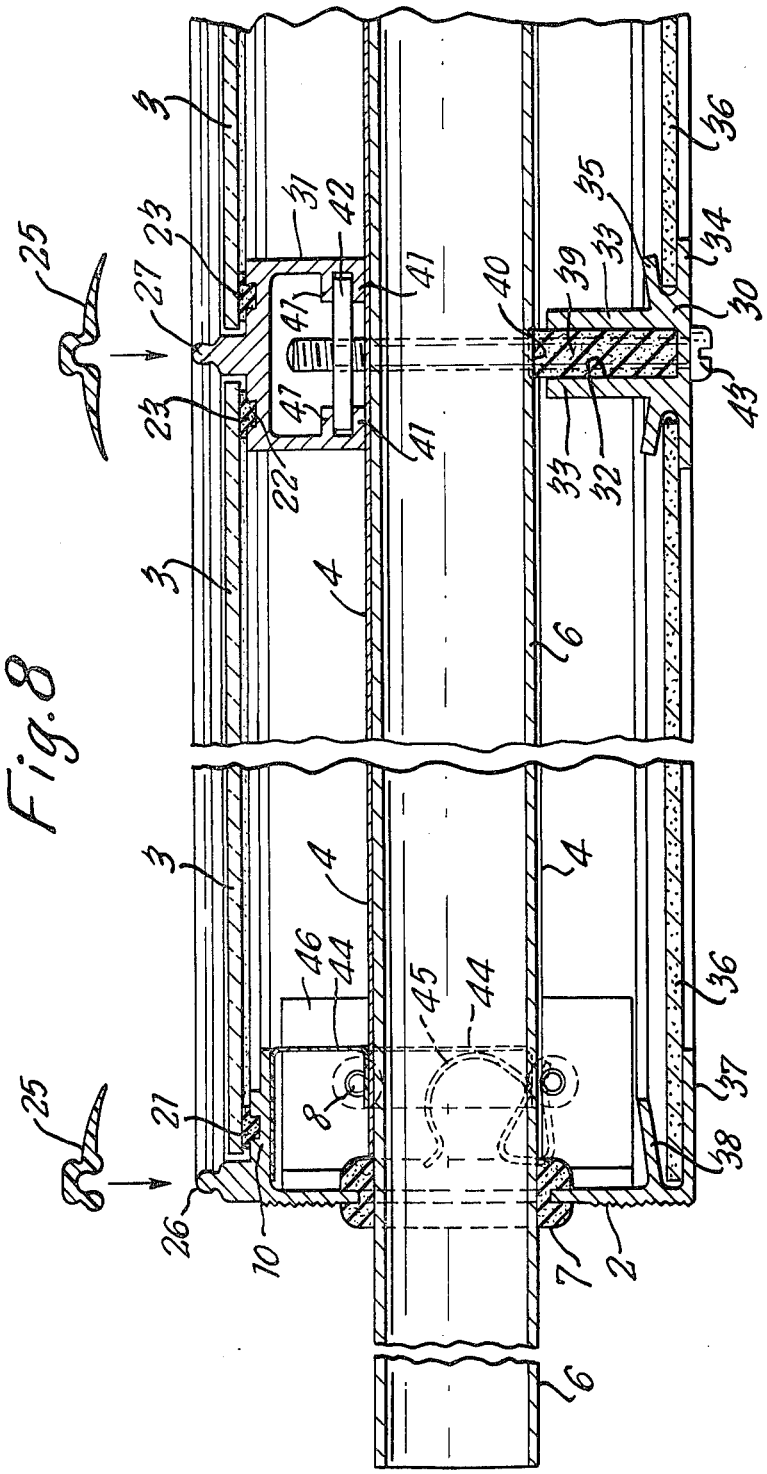

SOLAR HEATING PANELS

SUMMARY OF THE INVENTION

This invention relates to solar heating panels, that is to say panels which are exposed to receive radiation either directly or indirectly (by diffusion) from the sun and which convert the received radiation into heat which is taken from the panel by a fluid which flows through it.

Conventional solar heating panels include an absorber or collector plate which is an essentially flat metal plate coated with a black matt radiation-absorbing material so that the plate absorbs as much received radiation as possible, and a plurality of tubes to which heat is transferred from the absorber plate for heating a fluid, usually water, flowing within the tubes. However, the solar heating panels which have been commercially available hitherto have all been subject to one or more disadvantages and in general they have only a low efficiency of conversion of the received radiation into useful heat energy.

According to the present invention there is provided a solar heating panel comprising an absorber plate for absorbing solar radiation falling thereon, the absorber plate being formed with a plurality of corrugations each of which defines a U-shaped channel in the reverse surface of the plate, each channel having a semi-cylindrical internal surface, a corresponding plurality of cylindrical tubes for carrying a liquid to be heated, each tube being located in a respective U-shaped channel and each tube having an external diameter which is equal to the diameter of the said internal semi-cylindrical surface of the associated U-shaped channel, and locating means which comprise an upper locating means bearing on the corrugations in the absorber plate and urging the internal semi-cylindrical surfaces of the U-shaped channels into heat conducting contact with the external cylindrical surfaces of the tubes, and lower locating means bearing on the tubes and urging the tubes into heat conducting contact with the internal semi-cylindrical surfaces of the U-shaped channels.

The action of the upper locating means and the lower locating means on the corrugations in the absorber plate and the tubes, respectively, results in the absorber plate and the tubes being effectively clamped together with the internal semi-cylindrical surfaces of the U-shaped channels and the upper parts of the external cylindrical surfaces of the associated tubes maintained in heat conducting contact with one another.

In the solar heating panel according to the present invention the corrugations which define the U-shaped channels in the reverse surfaces of the absorber plate are advantageously formed by pressing the absorber plate on a machine mandrel which results in the internal semi-cylindrical surfaces of the U-shaped channels being essentially smooth. The U-shaped channels are formed so that their internal semi-cylindrical surfaces have exactly the same curvature as the outer cylindrical surfaces of the tubes, and the tubes are formed to have external surfaces which have a similar smoothness to the internal semi-cylindrical surfaces of the U-shaped channels. The surfaces between which heat is to be conducted as the principal means of heat transfer from the absorber plate to the tubes are thus, within manufacturing tolerances, smooth surfaces having identical curvatures.

The present invention further comprehends a solar heating panel comprising a frame formed from frame members defining the side and end walls of the panel, an absorber plate for absorbing solar radiation falling thereon, the absorber plate being formed with a plurality of corrugations each of which defines a U-shaped channel in the reverse surface of the plate, each channel being substantially parallel to a side wall of the panel and each channel having a semi-cylindrical internal surface, a corresponding plurality of cylindrical tubes for carrying a liquid to be heated, the external diameter of each tube being equal to the internal diameter of the semi-cylindrical internal surface of the associated U-shaped channel, and locating means for locating the tubes within the U-shaped channels, the locating means comprising upper locating means bearing on the upper curved surfaces of the corrugations in the absorber plate, and lower locating means bearing on the lower surfaces of the tubes, the upper locating means including bar members and the lower locating means including inverted T-bars, and both the bar members and the T-bars being secured to the side frame members in positions for effectively clamping the upper parts of the cylindrical surfaces of the tubes in heat conducting contact with the internal semi-cylindrical surfaces of the U-shaped channels.

The heat conducting contact between the internal semi-cylindrical surfaces of the U-shaped channels and the upper parts of the external cylindrical surfaces of the associated tubes may be an intimate surface contact between two essentially smooth surfaces. Alternatively, however, the heat conducting contact may be a contact through a thin film (for example 25 microns in thickness or less) of a heat conducting grease-like compound which is pressed into full contact with the internal semi-cylindrical surfaces of the U-shaped channels and the upper parts of the external cylindrical surfaces of the associated tubes.

In one embodiment of the present invention the corrugations in the absorber plate are formed so that the U-shaped channels have a depth which is less than the diameters of the cylindrical tubes and the thermally insulating material of the lower locating means includes a thermally insulating material having a substantially flat upper surface which supports the portions of the tubes which protrude from the U-shaped channels and which urges the tubes into heat conducting contact with the semi-cylindrical surfaces of the U-shaped channels.

In another embodiment of the invention which will be described, the corrugations in the absorber plate are formed such that the U-shaped grooves have a depth which is greater than the diameter of the cylindrical tubes and the lower locating means includes thermally insulating members which project into the U-shaped channels to engage the lower surfaces of the cylindrical tubes and urge the tubes into heat conducting contact with the semi-cylindrical surfaces of the U-shaped channels. Preferably, the thermally insulating members of the lower locating means have surfaces at least a part of which are curved to conform with the outer cylindrical surfaces of the tubes engaged by the lower locating means.

Advantageously the absorber plate and the cylindrical tubes are all made from a corrosion-resistant aluminium alloy. (When reference is made to the aluminium alloy being corrosion-resistant in this Specification it is meant that the aluminium alloy will not suffer significant deterioration as a result of exposure to the weather or to salt water). The use of a corrosion-resistant aluminium alloy in the manufacture of both the absorber plate and the cylindrical tubes is particularly desirable when the heat conducting contact between the semi-cylindrical surfaces of the U-shaped channels and the external surfaces of the tubes is an intimate surface contact between the two surfaces.

However, other metals may be used in the construction of both the absorber plate and the tubes and it is not essential for the tubes to be made of the same metal or metal alloy as the absorber plate. In particular the absorber plate and the tubes may be made of materials based on different metals when the heat conducting contact between the semi-cylindrical surfaces of the U-shaped channels and the external surfaces of the tubes is not an intimate surface contact but a contact through a film of a heat conducting substance, that is to say a substance having a heat conductivity of a similar order to the heat conductivity of a metal or a metal alloy. For example, the absorber plate may be made of aluminium alloy and the tubes of copper, the use of copper being particularly desirable when the panel is to be used as a source of heat in a domestic hot water system.

Advantageously, the upper locating means comprises a plurality of members formed from a corrosion-resistant aluminium alloy and coated with a black matt material for increasing the radiation absorbing properties of the members.

In the embodiments of the present invention which will be described the upper locating means includes a plurality of members located transversely of the corrugations in the absorber plate, the members being constructed to have a pair of parallel sides the lower peripheries of which contact the upper surfaces of the corrugations in the absorber plate.

BRIEF DESCRIPTION OF DRAWINGS

The present invention will be better understood from the following detailed description of preferred embodiments thereof which is made, by way of example, with reference to the accompanying drawings, in which:

FIG. 1 is a plan view of a solar heating panel in accordance with the present invention, FIGS. 2 and 3 are respectively side and end views of the solar heating panel of FIG. 1, FIG. 4 is an enlarged sectional view of a part of the solar heating panel of FIG. 1 taken along the line "A—A" of that Figure, FIG. 6 is an enlarged sectional view of a part of the solar heating panel of FIG. 1 taken along the line "C—C" of that Figure, FIG. 7 is a part of a plan view of another solar heating panel in accordance with the present invention, FIG. 8 is an enlarged sectional view of a part of the solar heating panel of FIG. 7 taken along the line "D—D" of that Figure.

In the drawings the same or similar parts are designated by like reference numerals.

DETAILED DESCRIPTION

Figure 5:
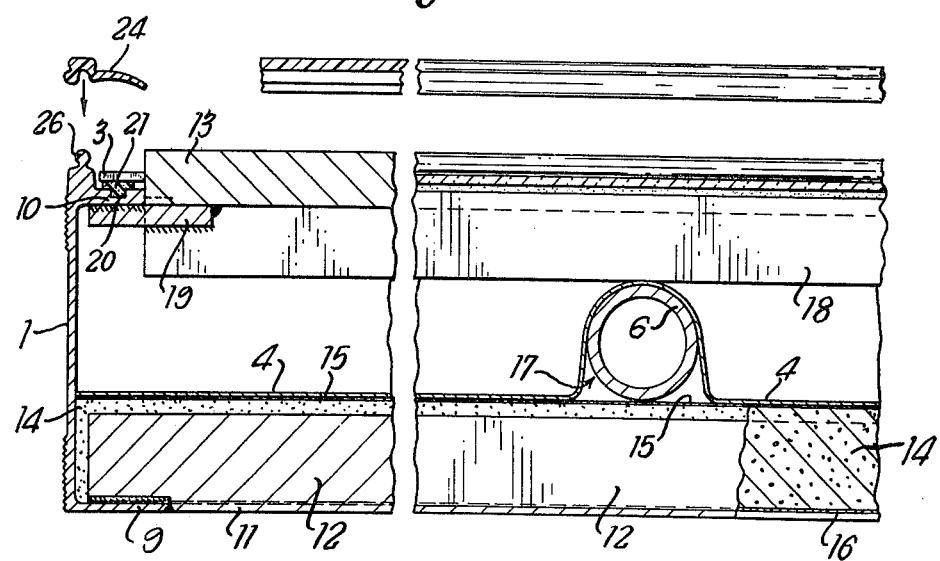
FIG. 5 is an enlarged sectional view of a part of the solar heating panel of FIG. 1 taken along the line "B—B" of that Figure.

Referring particularly to FIGS. 1 to 3 of the drawings, there is shown a first embodiment of a solar heating panel which is defined by side frame members 1 and end frame members 2 which together form a rectangular frame. The upper surface of the solar heating panel is formed by glass plates 3. Beneath the glass plates 3 and exposed to radiation received from the sun and passing through the glass plates 3 is an absorber plate 4 which has an upper surface area essentially filling the whole of the panel within the frame defined by the frame members 1 and 2.

The absorber plate 4 is therefore essentially a flat plate, but, as shown in the embodiment of the invention illustrated in FIG. 1, the absorber plate 4 is formed with five corrugations 5 which extend throughout the length of the absorber plate 4 in a direction substantially parallel to the long side of the solar heating panel. The corrugations 5, which are equidistantly spaced from one another extend upwardly from the general plane in which the absorber plate 4 lies, and thereby define U-shaped channels in the lower surface of the absorber plate 4. As seen in FIG. 1 therefore the corrugations 5 are projecting ridges extending upwardly from the absorber plate 4.

The absorber plate 4 is a 22 gauge sheet made from a corrosion resistant aluminium alloy obtainable from Birmetals Ltd. under the name Birmabright BB2. This aluminium alloy contains by weight from 1.7% to 2.4% of magnesium with small quantities of silicon, a maximum of 0.5%, iron 0.5%, chromium and manganese 0.5%, zinc 0.2%, and copper 0.1%, the balance, which is well in excess of 95%, being aluminium. The aluminium alloy sheet is coated with a selective matt black finish in order that the absorption of solar radiation by the absorber plate 4 is maximized.

The solar heating panel illustrated in FIGS. 1 to 3 also includes five cylindrical tubes 6. The ends of the tubes 6 project through circular apertures in the end frame members 2 of the solar heating panel, the tubes 6 being sealed in the end frame members 2 by neoprene grommets 7. The main portions of the tubes 6 are accommodated within the U-shaped channels formed in the lower surface of the absorber plate 4 by the corrugations 5.

The locations of the tubes 6 within the U-shaped channels formed by the corrugations 5 by upper and lower locating means will be described with particular reference to FIG. 5 of the accompanying drawings.

The tubes 6 themselves are also made from a corrosion resistant aluminium alloy, alloys based on aluminium being relatively good heat conducting materials and substantially cheaper than materials such as copper. In the embodiment which is being described the tubes 6 are made from an alloy which is obtainable under the name Birmabright 055T/E and which comprises by weight 0.4% to 0.9% of magnesium, 0.3% to 0.7% of silicon together with small quantities of copper 0.1%, iron 0.4%, manganese 0.1%, zinc 0.2%, titanium 0.2%, and chromium 0.1%, the balance being aluminium.

In operation the tubes 6 carry the liquid, usually water, which is the heat transfer medium for removing the heat received by the absorber plate 4 within the solar heating panel and transmitted from the absorber plate 4 through the tubes 6 to the liquid within the tubes 6.

The side and end frame members 1 and 2 are joined together by angle bracket pieces (not shown) and screws 8 in order to constitute the rectangular frame. The corners of the rectangular frame which are so formed are protected by one-piece plastic snap-on corner trimmers 8a.

As shown in FIGS. 4 and 5 of the accompanying drawings each of the frame members 1 and 2 consists of a vertical member, which defines the external side or end wall of the solar heating panel, and lower and upper inwardly projecting flanges 9 and 10. Supported on the lower inwardly projecting flanges 9 and on the horizontal parts or flanges 11 of inverted T-bars 12 which are joined between the lower parts of the opposite side frame members 1 directly beneath glazing bars 13 (see FIGS. 1 and 6), are thermally insulating boards 14. The boards 14 are made of a thermally insulating material having sufficient strength to support the weight of the absorber plate 4 and the tubes 6, and are preferably made of an expanded plastics material, for example expanded polystyrene or expanded polyurethane. A suitable thermally insulating board comprising a laminated urethane foam is obtainable under the trade name Coolag. The Coolag insulation boards have a thickness of about 25 mm and a density in excess of 3 kg per cubic meter. The Coolag insulation boards also exhibit substantial strength against compression, tensile and shear forces.

In the preferred form of this first embodiment of the present invention, the thermally insulating board 14 carries, on both its upper and lower surfaces, sheets of reflecting aluminium foil denoted respectively by the reference numerals 15 and 16. There are available Coolag insulation boards, the upper and lower faces of which are surfaced with aluminium foil.

As best illustrated in FIG. 5 the absorber plate 4 and the tubes 6 are supported upon the thermally insulating boards 14 in immediate contact with the upper surface of the upper sheet of aluminium metal foil 15 on the boards 14. The shape of one of the U-shaped channels formed by the corrugations in the absorber plate 4 is clearly illustrated at 17 in FIG. 5. The U-shaped channel 17 in the absorber plate 4 has an internal semi-cylindrical surface of identical curvature to the outer surface of the tube 6 which is located in the U-shaped channel 17. Both the outer cylindrical surface of the tube 6 and the internal semi-cylindrical surface of the U-shaped channel 17 are machined surfaces so that they are both smooth, and intimate surface contact is obtained between the internal semi-cylindrical surface of the U-shaped channel 17 and the external cylindrical surface of the tube 6 over approximately half of the external surface of the tube 6. Good heat conduction from the absorber plate 4 to the tube 6 is thereby obtained.

The depth of the U-shaped channel 17 is less than the outside diameter of the tube 6 so that the whole of the tube 6 is not located within the U-shaped channel 17 in the absorber plate 4, but the lowermost parts of the surfaces of the tubes 6 protrude just beyond the plane defined by the lower flat surfaces of the absorber plate 4.

Accordingly, the sheet 15 of aluminium foil on the upper surface of the board 14 contacts the lowermost portions of the external surfaces of the tubes 6 which are constrained against movement away from the absorber plate 4. The sheet 15 of aluminium foil will also contact parts of the horizontal lower surface portions of the absorber plate 4 between the corrugations which define the U-shaped channels 17 in the absorber plate 4.

The construction illustrated in FIG. 5 provides for the maximum transfer of heat from the absorber plate 4 to the tube 6 which is obtainable with the material used for the construction of both the absorber plate 4 and the tube 6. This good heat transfer is achieved because, in addition to having the effective maximum surface contact between the machined surfaces of the absorber plate 4 and the tube 6, there is some slight radiation from the sides of the U-shaped channels 17 to the non-contacting surfaces of the tubes 6. The thermally insulating board 14 militates against heat loss from the lower sides of the absorber plate 4 and the tubes 6 by conduction and the presence of the aluminium foils 15 and 16 help to reduce heat loss from either the absorber plate 4 or the tubes 6 by radiation in a downward direction.

The T-bars 12 and the thermally insulating boards 14 which provide the support urging the tubes 6 into the U-shaped channels 17 together constitute lower locating means in this embodiment of the present invention.

As best shown in FIG. 6, the glazing bars 13, which constitute upper locating means in this embodiment of the present invention, are each constituted by a channel section having two downwardly projecting arms 18 which contact the upper surfaces of the corrugations 5 in the absorber plate 4. Each glazing bar 13, which is sprayed with a selective matt black finish, is joined to the upper inwardly projecting flange 10 on the side frame member 1 as shown in FIG. 5. The glazing bar 13 is fitted into a notch cut into the inwardly projecting flange 10 as illustrated in FIG. 5 and is then welded to the side frame member 1 by means of a flat metal bar 19 which contacts the under sides of both the upper flange 10 and the channel section of the glazing bar 13.

The welding of both the glazing bars 13 and the T-bars 12 to the side frame members 1 are effected after the thermally insulating boards 14, the absorber plate 4 and the tubes 6 have been assembled within the frame formed by joining the side and end frame members 1 and 2 by the angle bracket pieces (not shown). The T-bars 12 and the glazing bars 13 are welded into position such that the tubes 6 and the absorber plate 4 are effectively clamped together by the combined action of the lower and upper locating means, ensuring that intimate surface contact between the absorber plate 4 and the tubes 6 is maintained and there is good thermal conduction from the absorber plate 4 to the tubes 6 and the water which passes through the tubes 6. The T-bars 12 and glazing bars 13 also provide lateral rigidity for the solar heating panel as they constitute cross braces within the frame which are positioned equidistant from each other and from the adjacent end frame members 2.

The welding of the T-bars 12 to the lower flanges 9 on the side frame members 1 is effected by cutting back the horizontal parts or flanges 11 on the T-bars 12 to a distance such that these horizontal parts 11 butt up to the inner edge of the flange 9, after which welding of the vertical part or web of the T-bar 12 to the upper surface of the flange 9 is effected with welding of the horizontal parts 11 also to the flange 9 as a butt joint.

Sufficient tolerances are provided in the dimensions of the T-bars 12, the glazing bars 13 and the absorber plate 4 to enable the T-bars 12 and the glazing bars 13 to be welded to the side frame members 1 in such positions that the absorber plate 4 and the tubes 6 are pressed against one another to maintain the intimate surface contact between the machined surfaces on the U-shaped channels and the tubes 6.

The upper inwardly projecting flange 10 on each of the side and end frame members 1 has a dovetailed groove 20 for receiving a neoprene beading 21 and similar dovetailed grooves 22 are provided on the glazing bars 13 for receiving neoprene beadings 23. The sheets of glass 3 which constitute the top cover for the solar heating panel are supported on the neoprene beadings 21 and 23 and held in position by snap-on plastic beadings 24 and 25 which are snapped on to projections 26 and 27 on the top of the frame members 1 and 2 and the glazing bars respectively, and which provide a weather seal to the panel.

A second embodiment of a solar heating panel in accordance with the present invention will now be described with reference to FIGS. 7 to 9 of the accompanying drawings. This second embodiment of the present invention is a solar heating panel which, like the first embodiment, is defined by side frame members 1 and end frame members 2 together forming a rectangular frame, the upper surface of the panel being formed by glass plates 3. This second embodiment also includes an absorber plate 4 having corrugations 5 defining U-shaped channels in its lower surface, and cylindrical tubes 6 which are located within the U-shaped channels by a lower locating means which includes inverted T-bars 30 and an upper locating means which includes glazing bars 31. The solar heating panel of FIGS. 7 to 9 differs from the panel of FIGS. 1 to 6 principally in the design of the T-bars 30 and glazing bars 31, and the manner in which the cylindrical tubes 6 are clamped within the U-shaped channels formed by the corrugations 5 of the absorber plate 4 with the upper cylindrical surfaces of the tubes 6 in intimate surface contact with the semi-cylindrical internal surfaces of the corrugations 5.

The T-bars 30 are modified as compared with the T-bars 12 of the first embodiment of this invention in order to incorporate an upright channel 32 (FIG. 9) between two vertical members 33 of the T-bar, and also to have the horizontal portions of the T-bars split into diverging members 34 and 35 which form open jaws for receiving and supporting a backing plate 36 of glass-reinforced plastics material. The backing plate 36 is also supported in similar jaws formed by diverging members 37 and 28 which together constitute the lower inwardly projecting flanges on the side and end frame members 1 and 2 of this embodiment of the solar heating panel of the present invention. The backing plate 36, being of a glass-reinforced plastics material, is a thermally insulating material, but its primary function in this embodiment of the present invention is as a backing plate to provide rigidity in the whole panel and to protect the underside of the absorber plate 4 and the cylindrical tubes 6 from the wind or draughts which might otherwise cause substantial and undesired cooling effects.

This second embodiment of the present invention does not include any thermally insulating boards, such as the boards 14 of the first embodiment of the invention, as part of the lower locating means for supporting the tubes 6 in intimate surface contact with the semi-cylindrical surfaces of the U-shaped channels formed by the corrugations 5 in the absorber plate 4. Instead, the cylindrical tubes 6 are each supported by thermally insulating blocks 39 which are located in the upright channels 32 of the T-bars 30 at those portions of the channels 32 coincident with the position of the cylindrical tubes 6 as shown in FIG. 9. The thermally insulating blocks 39, which are preferably neoprene blocks, have a part of their surfaces 40 curved to a shape such as to engage and support the lower surfaces of the tubes 6.

The glazing bars 31, which constitute the upper locating means of this embodiment of the present invention, are modified as compared with the glazing bars 13 of the first embodiment of the invention by the presence of two pairs of inwardly projecting flanges 41. The two pairs of inwardly projecting flanges together define a channel for supporting a locking plate 42 which is preferably made of the same corrosion-resistant alloy as the absorber plate 4 and the glazing bars 31.

Located in the T-bars 30 at spaced locations between the corrugations 5 in the absorber plate 4 are locking screws 43 which extend through the channels 32 between the vertical members 33 and engage with the locking plate 42. In operation the locking screws 43 are screwed into the locking plate 42 in order to draw the locking plate 42 towards the T-bars 30, thereby causing the glazing bars 31 to press downwardly on the upper surfaces of the corrugations 5, and the upper surfaces of the blocks 39 located in the channels 32 of the T-bars 30 to press upwardly on the lower surfaces of the tubes 6. The semi-cylindrical surfaces of the U-shaped channels defined by the corrugations 5 of the absorber plate 4 are thus pressed into intimate surface contact with the upper cylindrical surfaces of the tubes 6 by a clamping means which includes the spaced locking screws 43, the T-bars 30, the thermally insulating blocks 39, and the glazing bars 31. The intimate surface contact thus ensures good thermal conduction between the semi-cylindrical surfaces of the U-shaped channels of the corrugations 5 in the absorber plate 4 and the cylindrical surfaces of the tubes 6.

Figure 9:
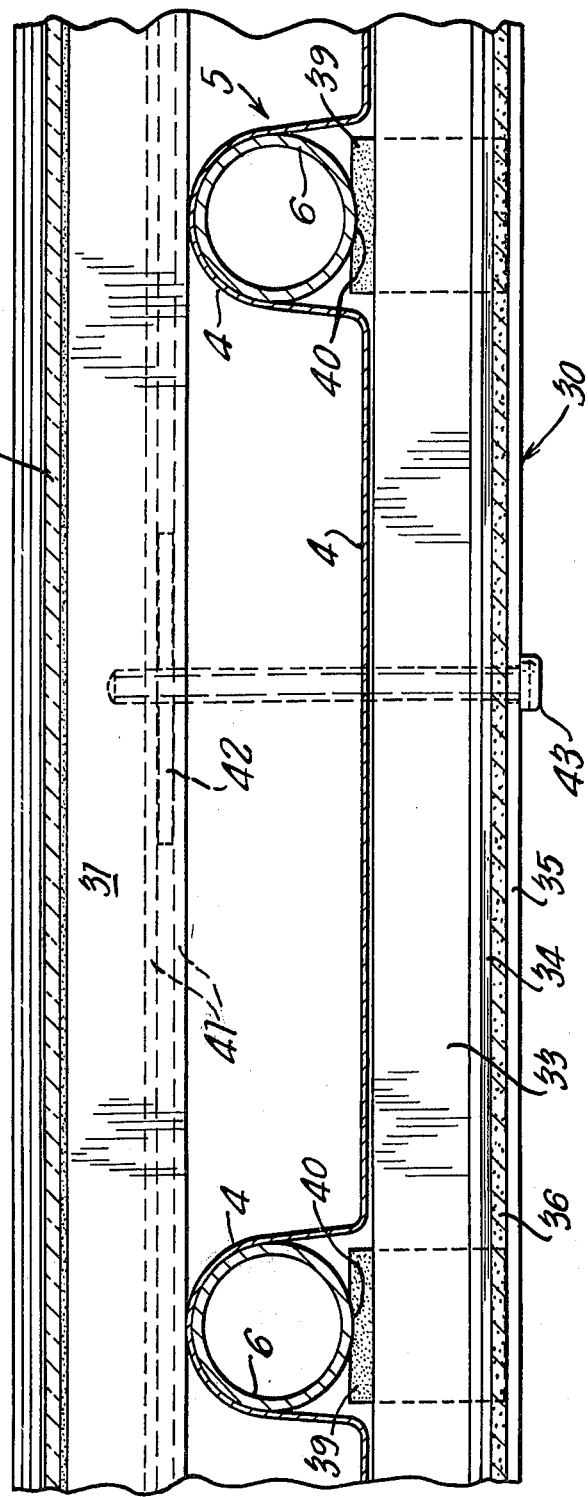
FIG. 9 is an enlarged sectional view of a part of the solar heating panel of FIGS. 7 and 8 taken along the line "E—E" of FIG. 7.

By the clamping arrangement illustrated in FIG. 9 good clamping of the tubes 6 in the U-shaped channels 5 is effected at the parts of the channel 32 which are remote from the junctions of the T-bars 30 and the glazing bars 31 with the side frame members 1.

The glazing bars 31 and T-bars 30 are caused to abut the side frame members 1 during assembly of the solar heating panel and are then welded to the side frame members 1 in such positions as to effectively clamp the tubes in intimate contact with the semi-cylindrical surfaces of the U-shaped channels.

In the second embodiment of the solar heating panel which is being described, a fibreglass end cover 44 which is shaped to engage the whole upper surface of the absorber plate 4 is forced into the end frame member 2 in order to locate the absorber plate 4 at the end frame and to provide a thermally insulating protection between the absorber plate 4 and the end frame member 2 itself. A clip 45 engages one of the screws 8 which joins the side frame member 1 to an angle bracket plate 46 which is also secured to the end frame member 2. The clip 45 also engages an upper surface of a flange on the fibreglass end cover 44 adjacent the angle bracket plate 46 to hold the fibreglass end cover 44 in position.

In the second embodiment of the invention which has just been described the depths of the U-shaped channels defined by the corrugations 5 are greater than the diameters of the tubes 6. As may be seen from FIG. 9 the blocks 39 extend within the open ends of the U-shaped channels in order to engage the lower surfaces of the tubes 6.

In both the embodiments of the invention which have been described it has been stated that the surfaces of the tubes 6 and the semi-cylindrical surfaces of the U-shaped channels of the corrugations 5 are in intimate surface contact and the intimate surface contact results in good thermal conductivity from the absorber plate 4 to the tubes 6, and the water flowing through the tubes 6. Good thermal conductivity between the semi-cylindrical surfaces of the U-shaped channels and the tubes 6 may also be obtained by applying to the semi-cylindrical surfaces of the U-shaped channels of the corrugations 5 and the external surfaces of the tubes 6, a good heat-conducting material in a grease-like form which is stable over the range of operating temperatures of the solar heating panel (for example the substance available as Dow Corning 340). The application of the heat-conducting material is made before the tubes are clamped into the U-shaped channels. The clamping of the absorber plate 4 and the vertical tubes 6 together, as described in either of the embodiments of the invention, reduces the grease-like heat-conducting material to a thin film of thickness of the order of one to two thousandths of an inch, the surfaces of this film following exactly the contours of the semi-cylindrical surfaces of the U-shaped channels and the outer cylindrical surfaces of the tubes 6. There is thus no surface contact between the tubes and the absorber plate, but the continuous film of the grease-like heat-conducting material provides thermal conductivity as good as is obtained by maintaining the most intimate surface contact between commercially produced smooth surfaces on both the channels and the tubes. Indeed, by excluding pockets of air from places where there may be irregularities in one or other of the surfaces which are clamped together, the heat-conducting grease-like substance provides substantially improved thermal conductivity between the surfaces in such areas.

The presence of a thin film, or barrier, (of the order of 2 thou in thickness) of thermally conducting grease between the surfaces of the tubes 6 and the channels enables the tubes 6 and the absorber plate 4 to be made of different metals, if desired, without significant deterioration due to electrolysis between different metals in the absorber plate 4 and the tubes 6 occurring. In particular, the presence of the grease enables the tubes 6 to be made of copper, which is highly desirable when the solar heating panel is to be used for hot water systems for domestic or industrial use.

When the cylindrical tubes 6 are made of copper in the second embodiment of the invention the space between the tubes 6 and the backing plate 36 is preferably filled by some suitable insulating material, such as fibreglass.

It is a feature of the present invention that the surfaces of the tubes 6 and the portions of the corrugations 5 of the absorber plate 4 which are effectively clamped in heat conducting contact are not rigidly secured to one another as would happen if solder were employed to fix the two parts together. Accordingly, solar heating panels in accordance with the present invention permit relative movement between the absorber plate and the tubes in a direction parallel to the axes of the tubes in consequence of differential thermal expansion or contraction as a result of the parts being at different temperatures. Such differential expansion is greater in the case when different metals are used for the absorber plate and the tubes, and this linear differential expansion is facilitated by the use of a grease-like compound to effect the heat-conducting contact between the clamped members.

Instead of providing glass sheets 3 as the upper covering for the solar heating panel in accordance with the present invention, a plastic glazing may be used. This has the advantage that it may be more readily rendered vandal proof. Also the panel is substantially lighter when made with a plastic glazing rather than with glass sheets.

The overall dimensions of the preferred panel in accordance with the present invention are about 2.45 m in length, 1 m in width and about 90 mm in depth. The tubes 6 have a constant outside diameter of 28 mm and a wall thickness of 1.2 mm. The tubes 6 thus have a wider bore than the tubes in conventional solar heating panels, with the result that faster flows of water through the panel may be achieved without leading to an excessive pressure drop across the panel. These faster flow rates are particularly required for efficient operation of a solar heating panel in larger commercial and industrial applications.

The construction of the embodiments of the solar heating panel herein described with reference to the accompanying drawings is such that the absorber plate 4 is enclosed and effectively shielded from the cooling influence of air currents. The design of the solar heating panel and its operation are intended to maintain the absorber plate 4 substantially at a thermal equilibrium in which heat is being received by the absorber plate 4 from solar radiation at a rate substantially equal to that at which the heat is being removed from the absorber plate 4 by the water passing through the five tubes 6.

The efficiency of the solar heating panel described herein varies inversely with the mean temperature of the water passing through the conductor tubes 6. When the mean temperature of the water passing through the conductor tubes 6 is 32° C. the efficiency of the solar heating panel described herein is of the order of 85%, but when the mean temperature of the water is 58° C. the efficiency is found to reduce to about 58%. Accordingly, the rate of flow of water through each tube should be such that the mean temperature of the water in the tube is kept down to a temperature of the order of 32° C. which is done by increasing the rate of flow of water through the tube. It is found that, in order to obtain conditions giving efficiencies approaching 85%, the rate of flow of water (which is dependent on the operating conditions including factors such as pump loads, frictional losses through the tubes, and temperature increase over the system) is in general in the region of 6,000 to 10,000 lbs per hour through each tube.

Under test conditions in England the solar heating panel having dimensions described herein is found to give an output of 17 kw per day on a clear mid-summer day when operating under conditions of 85% efficiency. On a dull mid-summer day in England the output of the panel at 85% efficiency was reduced to 7 kw per day thus showing that the panel still gives a useful output even when it is receiving only diffused radiation.

Although the use of locking screws 43 and locking plates 42 has been described in connection with an embodiment of the present invention in which the lower locating means comprises thermally insulating blocks 39 supported in upright channels 32 in the T-bars 30, similar locking screws and locking plates may equally be employed with other embodiments of the present invention, for example the embodiment in which the lower locating means includes boards 14 with thermally insulating material supported by flanges on the side and end frame members as well as by the T-bars.

Advantageously, the absorber plate, the glazing bars and the frame members are all made of aluminium alloy, for example Birmabright 055T/E. The use of essentially the same metal throughout these contacting parts of the solar heating panel effectively avoids the possibility of electrolytic action causing corrosion of any of these metal parts.

Also, when the solar heating panel is to be used in the heating of water for swimming pools it is desirable for the cylindrical tubes also to be made of corrosion resistant aluminium alloy because the water flowing through the tubes in this application will be either sea water or chlorinated water. In order to ensure that electrolytic corrosion does not occur in this application of solar heating panels in accordance with the present invention, the pipes which are connected to the ends of the tubes 6 for circulating the water or other liquid which is heated by passage through the tubes 6 are made either from plastic or from an aluminium based alloy.

It will be noted that in the embodiments of the invention which have been described heat is conducted from the absorber plate 4 to the tubes 6, and heat loss from the tubes 6 is kept to a practical minimum by ensuring that the tubes 6 are supported by lower locating means which includes a thermally insulating material and the tubes 6 are also insulated from the end frame member 2 by thermally insulating grommets 7. Contact of the tubes 6 with thermally conductive metal parts which can draw heat from the tubes is specifically avoided, so that there is a maximum transfer of heat to the water passing through the tubes 6.

We claim:

1. A solar heating panel comprising a frame formed from frame members defining the side and end walls of the panel, an absorber plate for absorbing solar radiation falling thereon, the absorber plate being formed with a plurality of corrugations each of which defines a U-shaped channel in the reverse surface of the plate, each channel being substantially parallel to a side wall of the panel and each channel having a semi-cylindrical internal surface, a corresponding plurality of cylindrical tubes for carrying a liquid to be heated, the external diameter of each tube being equal to the internal diameter of the semi-cylindrical internal surface of the associated U-shaped channel, and locating means for locating the tubes within the U-shaped channels, the locating means comprising upper locating means bearing on the upper curved surfaces of the corrugations in the absorber plate, and lower locating means bearing on the lower surfaces of the tubes, the upper locating means including bar members and the lower locating means including inverted T-bars, and both the bar members and the T-bars being secured to the side frame members in positions for effectively clamping the upper parts of the cylindrical surfaces of the tubes in heat conducting contact with the internal semi-cylindrical surfaces of the U-shaped channels.

2. A solar heating panel according to claim 1 wherein the T-bars include channels having therein blocks of thermally insulating material the upper surfaces of which engage the lower surfaces of the cylindrical tubes.

3. A solar heating panel according to claim 2 wherein the thermally insulating blocks extend within the U-shaped channels defined by the corrugations in the absorber plate.

4. A solar heating panel according to claim 2 wherein the thermally insulating blocks are neoprene blocks having at least part of their upper surfaces curved to conform with the outer cylindrical surfaces of the tubes engaged by the said surfaces of the neoprene blocks.

5. A solar heating panel according to claim 1 wherein the T-bars and flanges on the frame members defining the side and end walls of the panel support sheets of thermally insulating material.

6. A solar heating panel according to claim 1 wherein the T-bars and flanges on the frame members defining the side and end walls of the panel together support thermally insulating boards having a strength sufficient to support the absorber plate and the tubes, and the lower curved surfaces of the cylindrical tubes protrude from the U-shaped channels defined by the corrugations in the absorber plate for support by the upper surfaces of the thermally insulating material.

7. A solar heating panel according to claim 6 wherein the upper surfaces of the thermally insulating boards carry reflecting aluminium foils.

8. A solar heating panel according to claim 1 wherein the bar members each have a pair of opposed vertical walls, the lower peripheries of which bear on the curved surfaces of the corrugations in the absorber plate and pairs of inwardly-facing flanges on opposed vertical walls of the bar members, wherein a plurality of locking plates are supported by the flanges of one bar member in a plane substantially parallel to the plane of the absorber plate, and wherein the T-bars have a corresponding plurality of locking screws extending therethrough and engaging with threaded apertures in the respective locking plates for causing the upper locating means and the lower locating means to effectively clamp the semi-cylindrical internal surfaces of the U-shaped channels in heat conducting contact with the upper external surfaces of the tubes.

9. A solar heating panel according to claim 1 wherein the internal semi-cylindrical surfaces of the U-shaped channels are maintained in intimate surface contact with the external cylindrical surfaces of the tubes by the locating means.

10. A solar heating panel according to claim 9 wherein the absorber plate and the tubes are both made from corrosion-resistant aluminium alloy.

11. A solar heating panel according to claim 10 wherein the upper locating means is formed from a corrosion-resistant aluminium alloy and coated with a black matt material.

12. A solar heating panel comprising an absorber plate for absorbing solar radiation falling thereon, the absorber plate being formed with a plurality of corrugations each of which defines a U-shaped channel in the reverse surface of the plate, each channel having a semi-cylindrical internal surface, a corresponding plurality of cylindrical tubes for carrying a liquid to be heated, each tube being located in a respective U-shaped channel and each tube having an external diameter which is equal to the diameter of the said internal semi-cylindrical surface of the associated U-shaped channel, locating means which comprise an upper locating means including a plurality of spaced bar members bearing on the corrugations in the absorber plate and lower locating means bearing on the tubes and including a plurality of spaced bars disposed in aligned relationship below the bar members, wherein the bar members each have a pair of opposed vertical walls, the lower peripheries of which bear on the curved surfaces of the corrugations in the absorber plate and pairs of inwardly-facing flanges on opposed vertical walls of the bar members, wherein a plurality of locking plates are supported by the flanges of one bar member in a plane substantially parallel to the plane of the absorber plate, and clamping means extending through the bars of the lower locating means and engaging with threaded apertures in the respective locking plates for causing the upper locating means and the lower locating means to clamp the semi-cylindrical internal surfaces of the U-shaped channels in heat conducting contact with the upper external surfaces of the tubes.

13. A solar heating panel according to claim 12, wherein the absorber plate, the tubes and the bar members of the upper locating means are made from corrosion-resistant aluminium alloy.

14. A solar heating panel according to claim 12, wherein the bars include channels having therein blocks of thermally insulating material the upper surfaces of which engage the lower surfaces of the cylindrical tubes.

* * * * *